United States Patent [19]

Carpenter

[11] Patent Number: 5,188,176
[45] Date of Patent: Feb. 23, 1993

[54] CEMENT SLURRIES FOR DIVIATED WELLS

[75] Inventor: Robert B. Carpenter, Hurst, Tex.

[73] Assignee: Atlantic Richfield Company, Los Angeles, Calif.

[21] Appl. No.: 790,652

[22] Filed: Nov. 8, 1991

[51] Int. Cl.$^5$ .............................................. E21B 33/14
[52] U.S. Cl. ..................... 166/285; 166/250; 166/292; 166/50
[58] Field of Search ................ 166/292, 293, 29, 295, 166/285, 291, 50

[56] References Cited

U.S. PATENT DOCUMENTS

| | | | |
|---|---|---|---|
| 2,206,389 | 7/1940 | Cannon | 166/291 X |
| 2,848,051 | 8/1958 | Williams | 166/291 |
| 3,376,146 | 4/1968 | Mitchell | 166/293 X |
| 3,526,280 | 9/1970 | Aulick | 166/285 |
| 3,669,701 | 6/1972 | Biederman, Jr. | 166/292 |
| 3,804,058 | 4/1974 | Messenger | 166/292 |
| 3,887,385 | 6/1975 | Quist et al. | 166/293 X |
| 4,530,402 | 7/1985 | Smith et al. | 166/291 |

Primary Examiner—Stephen J. Novosad
Attorney, Agent, or Firm—James C. Fails

[57] ABSTRACT

What is disclosed is a method of cementing in which a plurality of cement slurries are employed in a well penetrating subterranean formations and having a deviated section of more than 55 degrees angle of inclination, the improvement comprising emplacing at a desired depth in the well a plurality of cement slurries, at least one of which is less dense than the drilling fluid employed to drill the well; and allowing the cement to set up in the well and to bond in situ and provide the zonal isolation and good bonding of equipment in the wellbore.

A specific example given in which one of the cements had a density of less than 12 pounds per gallon and one of the cement slurries has a density of greater than 12 pounds per gallon.

2 Claims, 1 Drawing Sheet

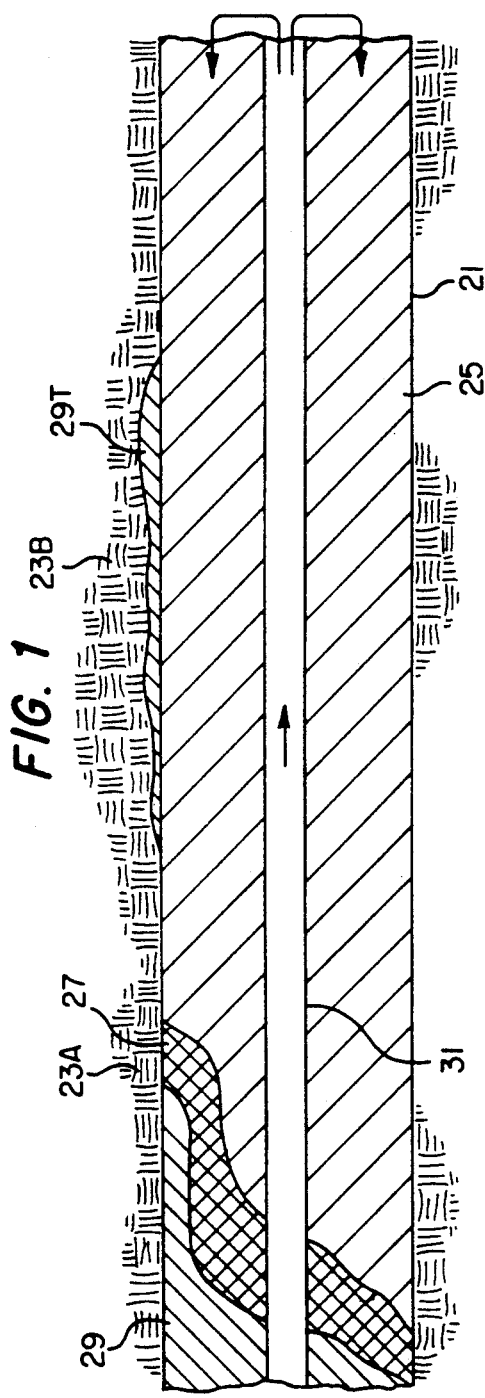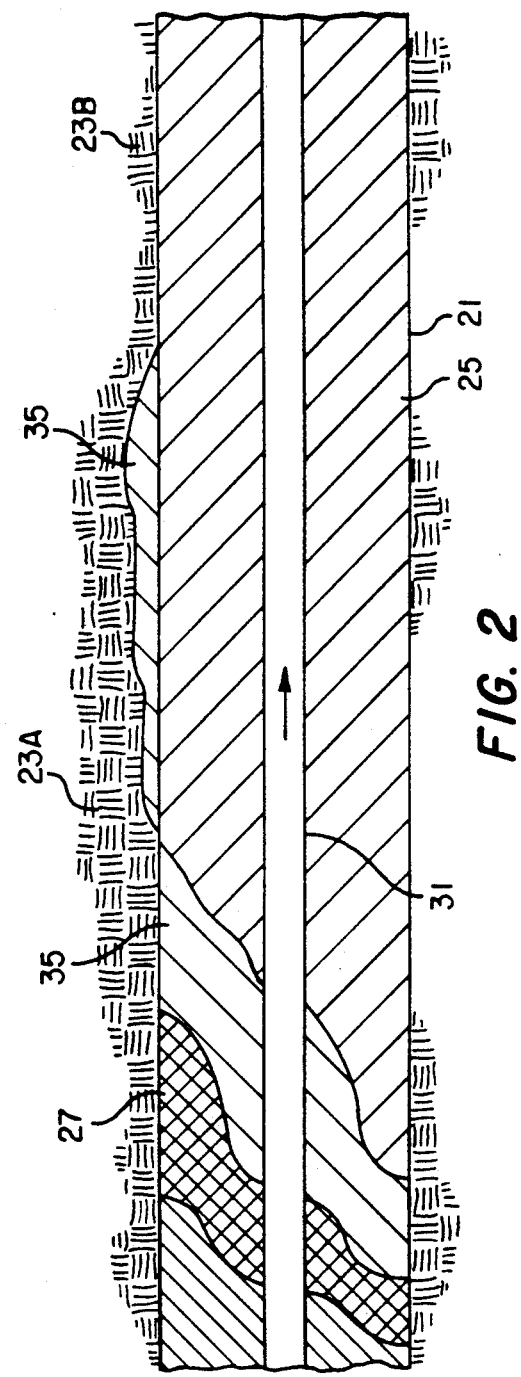

CEMENT SLURRIES FOR DIVIATED WELLS

FIELD OF THE INVENTION

This invention relates to cement slurry designs that enhance displacement efficiency in subsurface or subterranean cementing in oil field applications.

DESCRIPTION OF THE PRIOR ART

The prior art is replete with many disclosures of cementing in wells penetrating subterranean formations, as in oil field technology. Typically, when cementing a well, a cement spacer fluid and then one or more cement slurries are employed to displace/replace drilling fluid from an area of the wellbore and secure hydraulic zonal isolation across the cemented interval. However, poor or inefficient displacement of the drilling fluid remains one of the primary problems encountered in achieving effective hydraulic isolation.

The problem of cementing in wellbores penetrating subterranean formation is intensified when a portion of the wellbore; for example, up to several thousand feet, is deviated, or in a substantial degree departing from the vertical orientation that is normally effected by drilling to the desired depth in subterranean formations.

A lot of work has been done; there are several published papers and patents that are addressed to the problem of deviated wellbore cementing. Of these, the following are included:

U.S. Pat. No. 5,027,900, "Incremental Density Cementing Spacers", W.N. Wilson, Jul. 2, 1991.

SPE 16928 "A Laboratory Investigation of Cementing Horizontal Wells"; M.A. Wilson and F.L. Sabina of Halliburton, Copyright 1983; and "Guides Emerge for Cementing Horizontal Strings", Phillippe Parcevaux, Technology Section pates 35-41, Oct. 19, 1987 Oil and Gas Journal.

These past studies have shown that as the angle of inclination increases, so does the incidence and extent of annular communication problems. Poor mud displacement is cited as a prime factor in these studies. Wilson's work further details the phenomena of fluid density stratification in deviated wellbores and the resultant by-passing of drilling mud during cement placement. By-passing of less dense drilling fluid by the more dense cement creates uncemented intervals or mud channels that effectively destroy zonal isolation. The angle of inclination is measured with respect to the vertical; is illustrated in one of the publications which are incorporated by reference for any details omitted herein in the interest of brevity; and which may be in the range of from 55 degrees to 90 degrees, worse at about 85 degrees to 90 degrees.

Laboratory modeling of cement displacement mechanics in the wellbore by numerous researchers has demonstrated that wellbore fluids will segregate according to density. The more dense fluids will seek the bottom of the wellbore and the less dense fluids will seek the top. Due to this well recognized phenomena, it is generally recommended that each successive displacement fluid, i.e., spacer and cement be at least two pounds per gallon greater density than the displaced fluid, i.e., mud and spacer. This practice has been demonstrated to be particularly effective in vertical displacements. However, a single fluid of grater density does not effectively displace another in a high angle or horizontal wellbores, i.e., greater than 55 degrees deviation.

In a deviated wellbore interval, gravitational separation of more dense cements from the other wellbore fluids can leave behind or trap pockets of the less dense, non-cementitious fluids. As the angle of inclination, or deviation, increases so does the potential for entrapment of these fluids along the top sides of the annulus and as a result there is left in place a pathway for zonal communication. Expensive and often unsuccessful remedial operations are generally required.

SUMMARY OF THE INVENTION

Accordingly, it is an object of this invention to provide a method of cementing downhole in a wellbore penetrating subterranean formations, particularly at high deviated wells where it is deviated more than 55 degrees, to achieve substantially complete zonal isolation and through improved displacement of non-cementitious fluids.

These and other objects will become apparent from the descriptive matter hereinafter.

In accordance with one embodiment of this invention, there is provided a method of cementing downhole in wells penetrating subterranean formations and in highly deviated wells which includes flowing into the well to be left in situ a plurality of cementitious slurries, at least one of which is lighter than the drilling fluid within the wellbore; particularly, in deviated wells, for example, from 55 to 90 degrees to form a horizontal length of a hundred feet, or more. The discussion of the published articles are incorporated herein by reference as indication of a state of the art and for any details that are omitted herefrom.

As in frequently recognized, these highly deviated sections, frequently referred to as horizontal holes, provide an extended reach that has been produced heretofore without any cementing even though it is recognized that cementing provides selective zonal isolation and frequently improves the performance and flexibility of later production operations. Such cementing frequently employs set packers to provide zonal isolation until the cement can solidify. The type of cementing, as in this invention, provides a cement sheath that remains in place in the wellbore providing zonal isolation in the horizontal section of the well.

BRIEF DESCRIPTION OF THE DRAWINGS

FIG. 1 is a cross-section of a horizontal portion of a well which has been cemented in a conventional manner.

FIG. 2 is a cross-section of a horizontal portion of a well which has been cemented in accordance with the process of the invention.

DESCRIPTION OF THE PREFERRED EMBODIMENTS

Referring to FIG. 1, there is disclosed a horizontal portion of a well 21 formed through subsurface formations 23A, 23B, etc. which has been cemented with 15.8 ppg conventional cement 25, with the use of a 11.0 ppg ARCO spacer fluid 27 between the cement 25 and 10.0 ppg drilling mud 29. The upper end of the well is on the left. A production tube is shown at 31. In the cementing process the spacer 27 and cement 25 separated by a plug (not shown) are injected down the tube through an up-jet shoe (not shown) which then flows to the left.

The plug will rupture at the up-jet shoe. In FIG. 1, trapped mud is shown at 29T.

In this invention, the less dense cement slurry will displace the low density drilling fluid from the top of the well section; whereas, the more dense cement slurry will flow along the bottom of the horizontal section of the well.

Specifically, the more dense cement slurry flows to the bottom of the section of the well and cements the casing along the bottom thereof, and effectively displaces the less dense fluids from the bottom of the deviated annulus.

As a result of bracketing the drilling fluids density with two or more cement densities, the drilling fluid and cement spacer are effectively "wedged" or displaced from the horizontal wellbore interval leaving only cementious fluids.

Best results are obtained by the method of this invention in which a plurality of cement slurries are run and take their respective places in the horizontal section of the wellbore hole to provide no residual drilling fluid channels along the upper portion of the cemented annulus.

Use of this invention increases displacement efficiency in these highly deviated wellbores where a truly turbulent flow cement slurry is not a viable alternative.

In the upper portion of the horizontal section of the borehole, lower specific gravities of cement slurries are employed; for example, even lower than that of the drilling fluid that was employed in drilling the well.

A low density cement in the form of a foamed cement slurry, or a cement slurry employing low density microspheres will be emplaced by injecting a slug of from 5 to 95 percent by volume of the combined cement volume at a density less than that of drilling fluid. For example, densities on the order of 8 to 12 pounds per gallon (PPG) are frequently employed. This is ordinarily followed with more dense cement slurry which will run along the bottom of the casing and will join with the less dense cement slurry to form a completed annular cement sheath when left in the well at the desired location.

While the use of a cement slurry foamed with nitrogen or air, or a low density micro-sphere type slurry to form a less dense cement slurry has been described, at least implicitly hereinbefore, a more dense cement slurry may be formed by adjusting water/cement ratios or incorporating other density adjusting materials in accordance with conventional technology. The more dense cement will form a more impermeable mass. It will join with the less dense cement slurry to set up in situ when left at a desired location in the well. The less dense cement slurry may use fumed silica, fly ash and borosilicate microspheres or entrained gases; i.e., $N_2$ to achieve the desired cement density and thus prevent residual drilling fluid channels along the upper portion of the wellbore. The joinder of the cementious slurries provides zonal isolation.

The more dense cement slurry may form the remainder of the cement slurry if only two slurries are employed.

Expressed otherwise, if 10 to 90 percent of the low density cement slurry is employed, then 90 to 10 percent of the more dense cement slurry may be employed to join with the less dense cement slurry and provide complete zonal isolation and good bonding.

If, on the other hand, a greater number of cement slurries are employed, then the proportion of each may be varied responsive to desired design criteria. In the case of foam cement the foam cement density can be smoothly varied across the full density range by gradually decreasing or increasing the gas injection rate. The design criteria can be effected by simulating in a computer environment a plurality of slurries of respective densities to get the desired result. It is imperative that the following criteria be observed.

The well must have a highly deviated section in excess of 55 degrees. The publications show that the density separation becomes more severe when above about 60 degrees angle of inclination is experienced. It has been found by the invention herein that the problem of density separation becomes particularly severe in wells as angles approach 85–95, 100 degrees, or substantially horizontal.

If desired, spacer fluids may be employed herein as delineated in the prior art. The spacer fluids simply form a barrier between the drilling fluid and the cement so as to reduce the critical sensitivity of the rheological factors of the cement slurry contacting the drilling fluid. By preventing the mud from contaminating the cement, these spacer fluids minimize the tendency of drilling fluid dispersant to adversely affect or prolong cement strength development. These factors are all well known.

FIG. 2, illustrates the same well of FIG. 1, but a 9.8 ppg lightweight cement 35 is used between the cement 25 and the spacer 27. As shown the lightweight cement 35 displaces and prevents trapped mud at the top insuring that the well is cemented completely around the tube 31 and the walls of the well in the section shown. A plug (not shown) may be located between the cement 25 and the cement 35 while they are injected through the tube 31 for separation purposes.

An example of this invention is provided in the Yowlume 16X-4 in California.

A similar cement design was used in the Kuparak River Basin's (Alaska) 1R/21. Both the Yowlume 16X-4 and the Kuparak IR/21 were noted for excellent cement bond logs and zonal isolation. The horizontal Kuparak well, 1R/21, provided a cement bond log that was superior to that of adjacent vertical and less deviated wells.

EXAMPLE I

In the Yowlume 16X-4 cementation, about 100 barrels of 9.0 ppg cement was used to displace a 10.4 ppg mud from the high side of a 3700′ horizontal section of this, 15,300 ft. measured depth or 11,255 ft. true vertical depth, deviated wellbore. A greater volume of 13,5 ppg cement was used to effectively displace the vertical and the low side of the high angle intervals of the annulus. The low density or 9.0 ppg cement was formed with the use of fumed silica and fly ash micro-spheres; more specifically: API Class C cement, 100% micro-spheres, 10% fumed silica, 0.75% dispersant, 0.75% fluid loss additive, 0.057% retarder, 0.2% nonionic surfactant and 140% water, all concentrations being based on the starting weight of dry Portland cement. The cementation of this well was successful, an excellent cement bond was secured, and no remedial cementation was needed.

Once a base formulation is determined, additional additives such as dispersants, or fluid loss additives, retarders, accelerators and the like, can be added in much the way as they are in conventional cement slurry systems. The above cement design develops 1000 to 2000 PSI in 24 hours, depending on bottomhole temperature.

As the slurry density increases above 10 pounds per gallon, the compressive strength properties improve even more rapidly. Also, very low density (0.37-0.43 s.g.) borosilicate spheres can be used in place of the ceramic spheres to produce further slurry density reductions or greater strength/density relationships.

As downhole hydrostatic pressures increase, particularly above 4000 psi, a percentage of the fly ash or borosilicate glass micro-spheres are crushed (implode). This results in a increase in cement slurry density. In those wells where the density increase is too great and cannot be effectively addressed by increased microsphere concentrations, high strength borosilicate microspheres can be employed. The high strength (0.7 s.g.) borosilicate spheres can extend the hydrostate pressure range of these cement designs to beyond 10,000 psi.

EXAMPLE II

The following examples are cement slurries that have been employed to give about 9 pounds per gallon cement slurry density.

Basic Designs: 9.0 PPG (when percentages are indicated herein, they are percentages by weight—% by wt)

---

Type I Cement + 100% Fly Ash Micro-Spheres + 10% Fumed Silica + 132.5% Water
PV = 97   YP = 37   Compressive Strength: 700 PSI @ 24 hrs. @ 190 degrees F. BHST Type I Cement + 100% Fly Ash Micro-Spheres + 10% Fumed Silica + 0.6% Retarder + 112.5% Water
PV = 118   YP = 6   Thickening Time: 2 hrs. 56 mins. @ 190 degrees F. BHCT Type III Cement + 100% Fly Ash Micro-Spheres + 10% Fumed Silica + 132.5% Water
PV = 63   YP = 8   Compressive Strength 875 PSI @ 24 hrs. @ 190 degrees F. BHST Type III Cement + 100% Fly Ash Micro-Spheres + 10% Fumed Silica + 116.5% Water
PV = 68   YP = 48   Compressive Strength: 1200 PSI @ 24 hrs. @ 190 degrees F. BHST Type I Cement + 100% Fly Ash Micro-Spheres + 10% Fumed Silica + 0.6% Dispersant + 0.6% Fluid Loss Additive + 0.5% Retarder + 140% Water
PV = 102   YP = 30

Class G cement + 100% Fly Ash Micro-Spheres + 10% Fumed Silicate 1% Dispersant + 2 gal. Styrene Butadiene Latex/sk of cement (gal/sk) + 0.22 gal/sk Surfactant + 0.05 gal/sk defoamer & 0.13% Retarder + 12.39 gal/sk Fresh Water PV = 98   YP = −4   Compressive Strength: 700 psi @ 48 hrs @ 145 degrees F. BHST

---

What is claimed is:

1. In a method of cementing downhole in a wellbore in which a drilling fluid will have been used to drill the well, at least a portion or which is deviated more than a 55 angle of inclination; the improvement comprising:
    a. emplacing at a desired depth in the well a plurality of cement slurries, at least one of which is less dense than the drilling fluid employed to drill the well or current wellbore fluid, and
    b. allowing the cement to set up in the well to provide zonal isolation and bonding of equipment in the wellbore.

2. The method of claim 1 wherein at least one of said cements has a density less than 12 pounds per gallon and at least one of said cement slurries has a density greater than 12 pounds per gallon.

* * * * *